United States Patent
Gupta et al.

(10) Patent No.: US 11,086,694 B2
(45) Date of Patent: Aug. 10, 2021

(54) METHOD AND SYSTEM FOR SCALABLE COMPLEX EVENT PROCESSING OF EVENT STREAMS

(71) Applicant: IQLECT Software Solutions Pvt Ltd., Bangalore (IN)

(72) Inventors: Rajeev Gupta, Bangalore (IN); Mahesh Dhabade, Bangalore (IN); Mangesh Kute, Bangalore (IN); Prasad Deshpande, Bangalore (IN); Sachin Sinha, Bangalore (IN)

(73) Assignee: IQLECT Software Solutions Pvt Ltd., Bangalore (IN)

( * ) Notice: Subject to any disclaimer, the term of this patent is extended or adjusted under 35 U.S.C. 154(b) by 313 days.

(21) Appl. No.: 15/785,225

(22) Filed: Oct. 16, 2017

(65) Prior Publication Data

US 2018/0107530 A1     Apr. 19, 2018

(30) Foreign Application Priority Data

Oct. 18, 2016   (IN)   ............................ 201641035560

(51) Int. Cl.
*G06F 7/00* (2006.01)
*G06F 17/30* (2006.01)
*G06F 9/54* (2006.01)
*G06F 16/245* (2019.01)
*G06F 16/22* (2019.01)
(Continued)

(52) U.S. Cl.
CPC .......... *G06F 9/542* (2013.01); *G06F 16/2228* (2019.01); *G06F 16/2282* (2019.01); *G06F 16/2365* (2019.01); *G06F 16/245* (2019.01); *G06F 16/24568* (2019.01)

(58) Field of Classification Search
CPC ......... G06F 17/30321; G06F 17/30339; G06F 17/30371; G06F 17/30424; G06F 16/245; G06F 16/2282; G06F 16/2228; G06F 16/2365; G06F 9/542
See application file for complete search history.

(56) References Cited

U.S. PATENT DOCUMENTS

| | | | |
|---|---|---|---|
| 2010/0057660 A1* | 3/2010 | Kato ..................... | G06F 11/008 706/47 |
| 2012/0158783 A1* | 6/2012 | Nice ..................... | G06Q 30/02 707/776 |

(Continued)

*Primary Examiner* — Azam M Cheema
(74) *Attorney, Agent, or Firm* — Kolisch Hartwell, P.C.

(57) ABSTRACT

The present disclosure provides a method and system for a scalable complex event processing of event streams. The method includes reception of one or more input event streams and collection of one or more output event streams. Further, the method includes modeling of each instance of each input event stream and each instance of the plurality of instances for intermediate states as records of a database table. The method includes indexing of each record of the database table and distribution of a first set of records in temporary memory and the second set of records in one or more persistent storage devices. The method includes flushing the second set of records of the database table in one or more persistent storage devices and querying of the plurality of records of the database table. The method includes inferring one or more complex events from transition of a plurality of states.

20 Claims, 12 Drawing Sheets

(51) Int. Cl.
*G06F 16/23* (2019.01)
*G06F 16/2455* (2019.01)

(56) References Cited

U.S. PATENT DOCUMENTS

| | | | | |
|---|---|---|---|---|
| 2013/0191517 | A1* | 7/2013 | Ling | H04L 41/0859 |
| | | | | 709/220 |
| 2014/0095483 | A1* | 4/2014 | Toillion | G06F 16/24568 |
| | | | | 707/722 |
| 2014/0351639 | A1* | 11/2014 | Vandikas | G06F 11/1438 |
| | | | | 714/20 |
| 2016/0360008 | A1* | 12/2016 | Brown | H04L 67/327 |

* cited by examiner

METHOD AND SYSTEM FOR SCALABLE COMPLEX EVENT PROCESSING OF EVENT STREAMS

INTRODUCTION

The present disclosure relates to a field of event processing. More specifically, the present disclosure relates to a method and system for a scalable complex event processing of event streams.

In recent years, there is an increasing demand for the use of real time complex event processing systems. These real time event processing systems evaluate a variety of simple events occurring within a defined process environment to infer occurrences of one or more complex events. Example of such process environments includes business activity management, business process management, stock market events, click stream analysis, market analysis and the like. These real time complex event processing system monitors streams of events from the defined process environment.

Traditionally, the complex event processing of defined process environments are implemented by using finite state machines. In each finite state machine, the states represent occurrence of a relevant temporal event that may eventually lead to infer occurrence of complex event. The event streams are loaded in temporary memory of the processing systems and multiple temporal and non-temporal queries are applied. In addition, the event streams are modeled as in memory data structures in the temporary memory. The occurrence of any state change often leads addition of new event data in the temporary memory.

The present complex event processing systems bear several disadvantages. The number of events instances in memory is limited by the use of in memory data structures. In addition, the temporary memory has a limited storage space for real time storage of event streams and states data. The space limitation plays a significant role when the temporal query is either complex or the execution period of query is sufficiently long and the rate of reception of event stream data is significant. In addition, the incoming event streams and the recently processed event streams are not indexed in the temporary memory. The improper indexing of event and state data lead to delay in processing of data in the real time.

In light of the above stated discussion, there is a need for a method and system that overcomes the above stated disadvantages.

SUMMARY

In an aspect, the present disclosure provides a computer-implemented method for a scalable complex event processing of event streams. The computer-implemented method includes a step of receiving one or more input event streams. The one or more input event streams are associated with a plurality of states of one or more finite state machines. The one or more one or more input event streams are present sequentially in temporary memory. Further, the computer-implemented method includes another step of collecting one or more output event streams. The one or more output event streams correspond to each input event stream of the one or more input event streams. The computer-implemented method includes yet another step of modeling each instance of each input event stream of the one or more input event streams as a record of a plurality of records of a database table. Each instance of the plurality of instances of intermediate states and each instance of each output event stream of the plurality of output event streams is modeled as record of the plurality of records of the database table. In addition, each state data of a plurality of states data is modeled as record of the plurality of records of the database table. Furthermore, the computer-implemented method includes yet another step of indexing each record of the plurality of records of the database table. The computer-implemented method includes yet another step of distributing a first set of records of the plurality of records of the database table in the temporary memory and a second set of records of the database table to one or more persistent storage devices. The computer-implemented method includes yet another step of flushing the second set of records of the plurality of records of the database table in the one or more persistent storage devices. In addition, the computer-implemented method includes yet another step of querying the plurality of records of the database table. The plurality of records of the database table is queried by a complex event processing engine. Moreover, each input event stream of the one or more input event streams includes a plurality of instances. Each instance of the plurality of instances is associated with a simple event of one or more simple events. Further, the database table is indexed for leveraging identification of key instances. Moreover, the first set of records and the second set of records of the database table are logically distributed based on a real time analysis of a plurality of factors. The complex engine processing engine executes one or more CEP queries on a sliding window of one or more records of the database table in real time.

In an embodiment of the present disclosure, the computer-implemented method includes yet another step of updating one or more states data of the plurality of states data based on the one or more CEP queries. The one or more states data of the plurality of states data is updated as records of the database table.

In an embodiment of the present disclosure, the computer-implemented method includes yet another step of dropping one or more records of the database table from the temporary memory and the one or more persistent storage devices. The one or more records of the database table are dropped based on at least one of an execution of at least one of one or more CEP queries and a completion of a duration of execution of the at least one of the one or more CEP queries.

In an embodiment of the present disclosure, the computer-implemented method includes yet another step of inferring one or more complex events from a positive detection of the one or more simple events. The one or more complex events are inferred from transition of the one or more states of the one or more finite state machines.

In an embodiment of the present disclosure, the plurality of factors for determination of the flushing of the second set of records of the database table to the one or more persistent storage devices includes an amount of free space in the temporary memory. Further, the plurality of factors include a rate of incoming of the one or more input event streams, a complexity of one or more temporal queries and a number of stages in the complex event processing engine. Furthermore, the plurality of factors includes a number of states in each of the one or more finite state machines and a complexity of schema of the database table. Moreover, the plurality of factors includes a sliding window of duration of execution of the one or more CEP queries for detection of one or more complex events. The sliding window corresponds to discretized time duration for execution of the one or more CEP queries on a selected subset of instances of the plurality of instances of the one or more input event streams.

The selected subset of instances is processed for at least one of filtering, window join, aggregation and complex pattern detection.

In an embodiment of the present disclosure, the one or more CEP queries include at least one of one or more temporal queries and one or more non-temporal queries.

In an embodiment of the present disclosure, the first set of records of the database table is recent events and the second set of records of the database table is recent historical events.

In an embodiment of the present disclosure, each output event stream of the one or more output event streams includes the plurality of instances and the one or more states data as indexed plurality of records of the database table. The complex event processing engine produces the output event stream after execution of the one or more CEP queries on the sliding window of the one or more records of the database table.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for a scalable complex event processing of event streams. The method includes a step of receiving one or more input event streams. The one or more input event streams are associated with a plurality of states of one or more finite state machines. The one or more one or more input event streams are present sequentially in temporary memory. Further, the method includes another step of collecting one or more output event streams. The one or more output event streams correspond to each input event stream of the one or more input event streams. The method includes yet another step of modeling each instance of each input event stream of the one or more input event streams as a record of a plurality of records of a database table. Each instance of the plurality of instances of intermediate states and each instance of each output event stream of the plurality of output event streams is modeled as record of the plurality of records of the database table. In addition, each state data of a plurality of states data is modeled as record of the plurality of records of the database table. Furthermore, the method includes yet another step of indexing each record of the plurality of records of the database table. The method includes yet another step of distributing a first set of records of the plurality of records of the database table in the temporary memory and a second set of records of the database table to one or more persistent storage devices. The method includes yet another step of flushing the second set of records of the plurality of records of the database table in the one or more persistent storage devices. In addition, the method includes yet another step of querying the plurality of records of the database table. The plurality of records of the database table is queried by a complex event processing engine. Moreover, each input event stream of the one or more input event streams includes a plurality of instances. Each instance of the plurality of instances is associated with a simple event of one or more simple events. Further, the database table is indexed for leveraging identification of key instances. Moreover, the first set of records and the second set of records of the database table are logically distributed based on a real time analysis of a plurality of factors. The complex engine processing engine executes one or more CEP queries on a sliding window of one or more records of the database table in real time.

In yet another aspect, the present disclosure provides a computer-readable storage medium. The computer readable storage medium enables encoding of computer executable instructions. The computer executable instructions when executed by at least one processor perform a method. The at least one processor performs the method for a scalable complex event processing of event streams. The method includes a step of receiving one or more input event streams. The one or more input event streams are associated with a plurality of states of one or more finite state machines. The one or more one or more input event streams are present sequentially in temporary memory. Further, the method includes another step of collecting one or more output event streams. The one or more output event streams correspond to each input event stream of the one or more input event streams. The method includes yet another step of modeling each instance of each input event stream of the one or more input event streams as a record of a plurality of records of a database table. Each instance of the plurality of instances of intermediate states and each instance of each output event stream of the plurality of output event streams is modeled as record of the plurality of records of the database table. In addition, each state data of a plurality of states data is modeled as record of the plurality of records of the database table. Furthermore, the method includes yet another step of indexing each record of the plurality of records of the database table. The method includes yet another step of distributing a first set of records of the plurality of records of the database table in the temporary memory and a second set of records of the database table to one or more persistent storage devices. The method includes yet another step of flushing the second set of records of the plurality of records of the database table in the one or more persistent storage devices. In addition, the method includes yet another step of querying the plurality of records of the database table. The plurality of records of the database table is queried by a complex event processing engine. Moreover, each input event stream of the one or more input event streams includes a plurality of instances. Each instance of the plurality of instances is associated with a simple event of one or more simple events. Further, the database table is indexed for leveraging identification of key instances. Moreover, the first set of records and the second set of records of the database table are logically distributed based on a real time analysis of a plurality of factors. The complex engine processing engine executes one or more CEP queries on a sliding window of one or more records of the database table in real time.

BRIEF DESCRIPTION OF THE DRAWINGS

Figure 1:
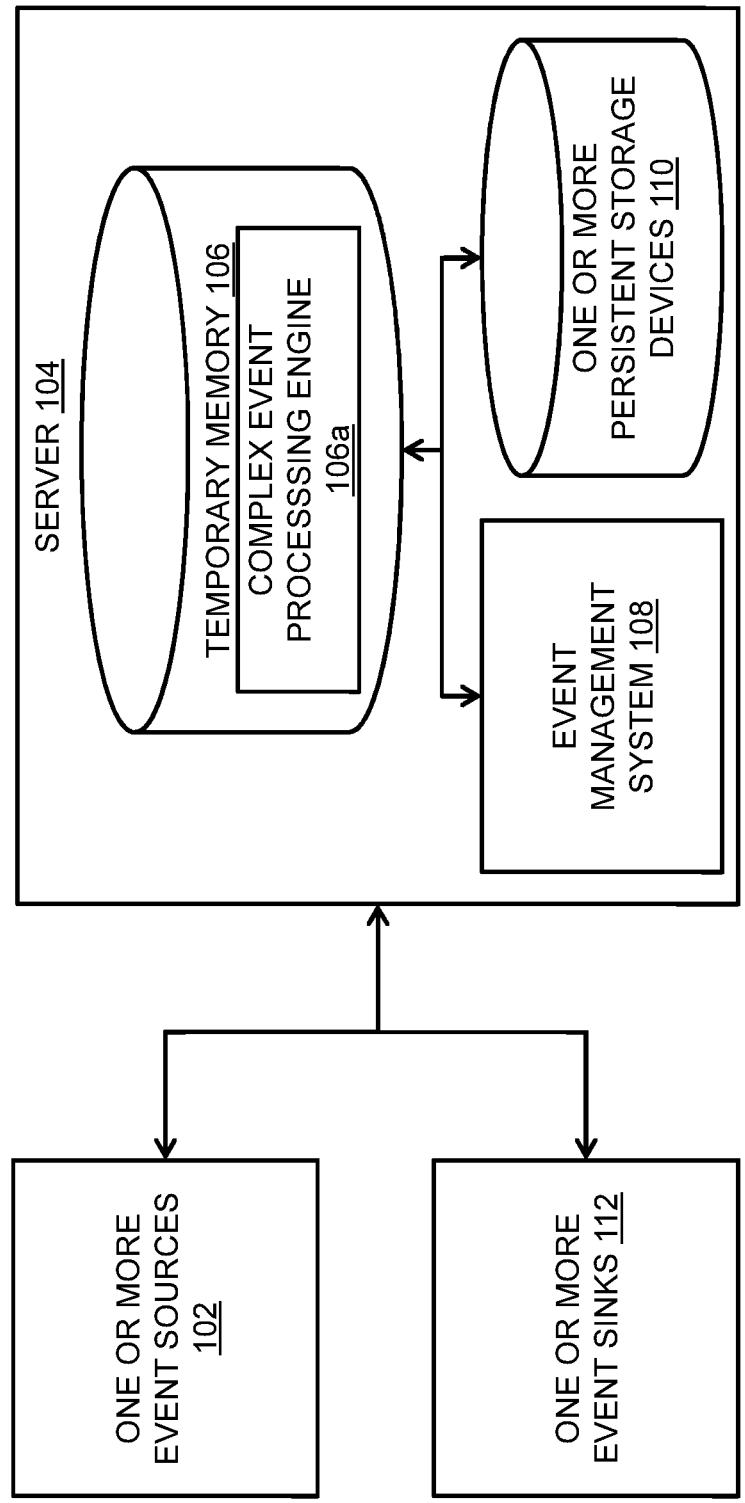
Figure 2:
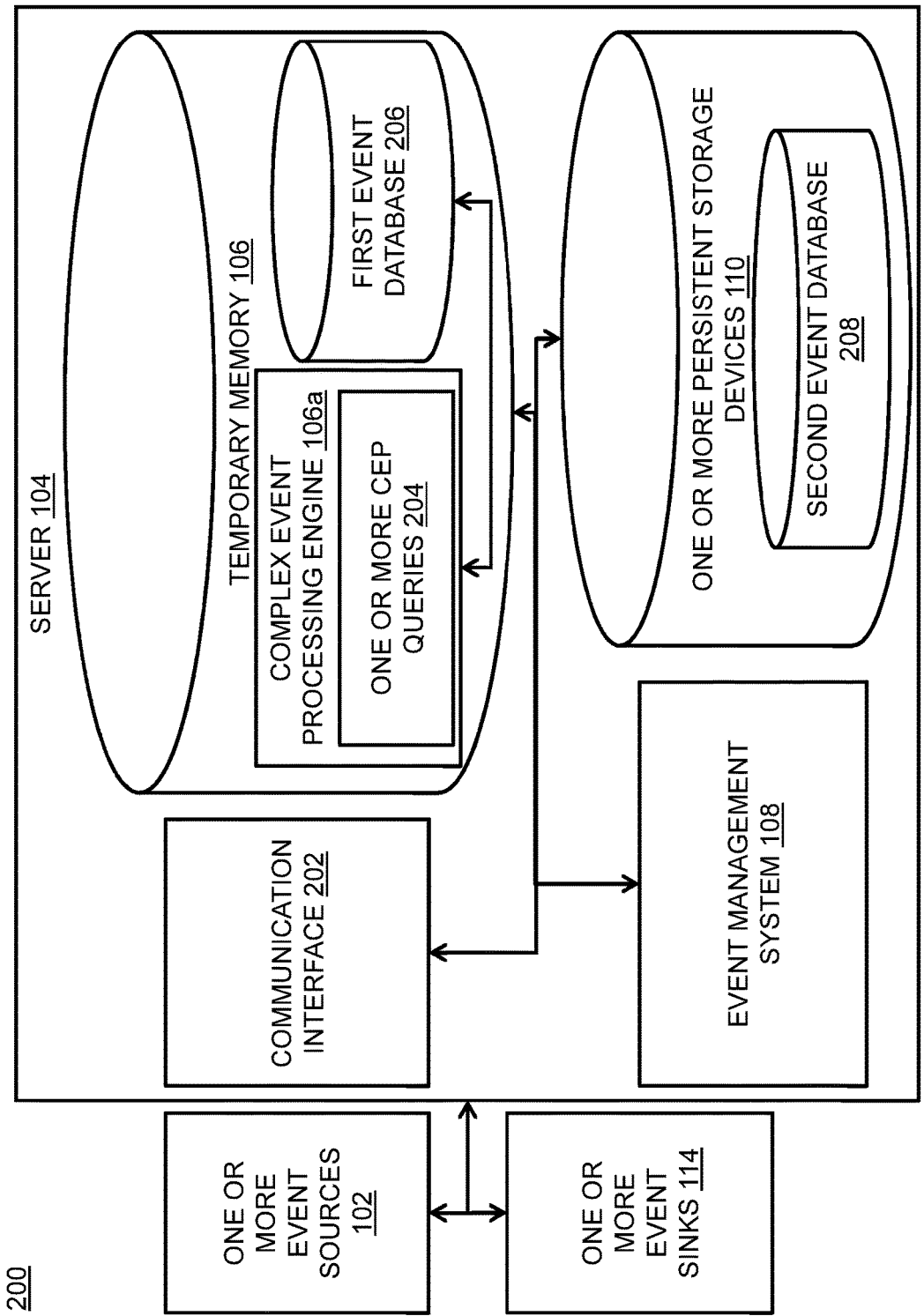
Figure 3:
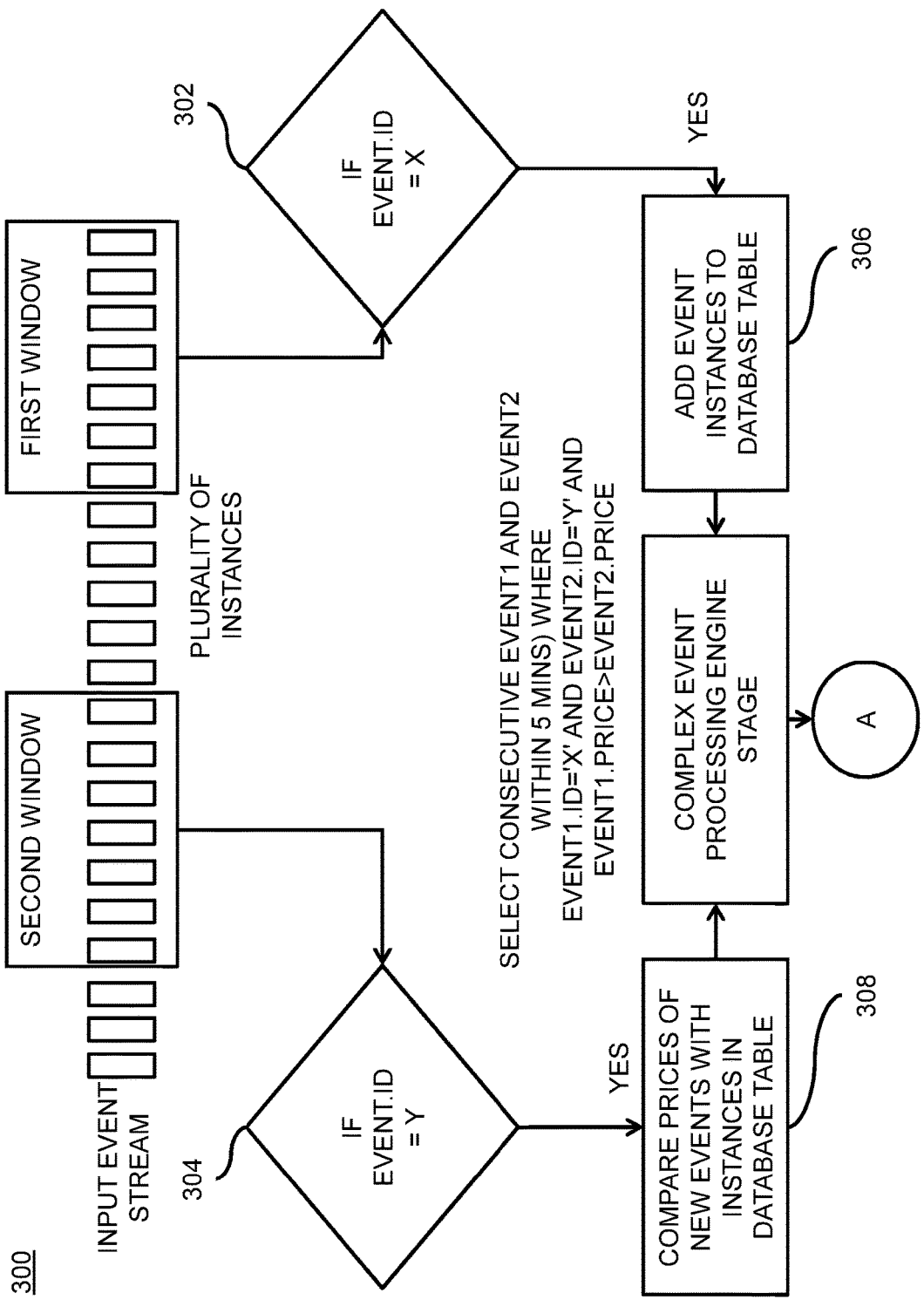
Figure 4:
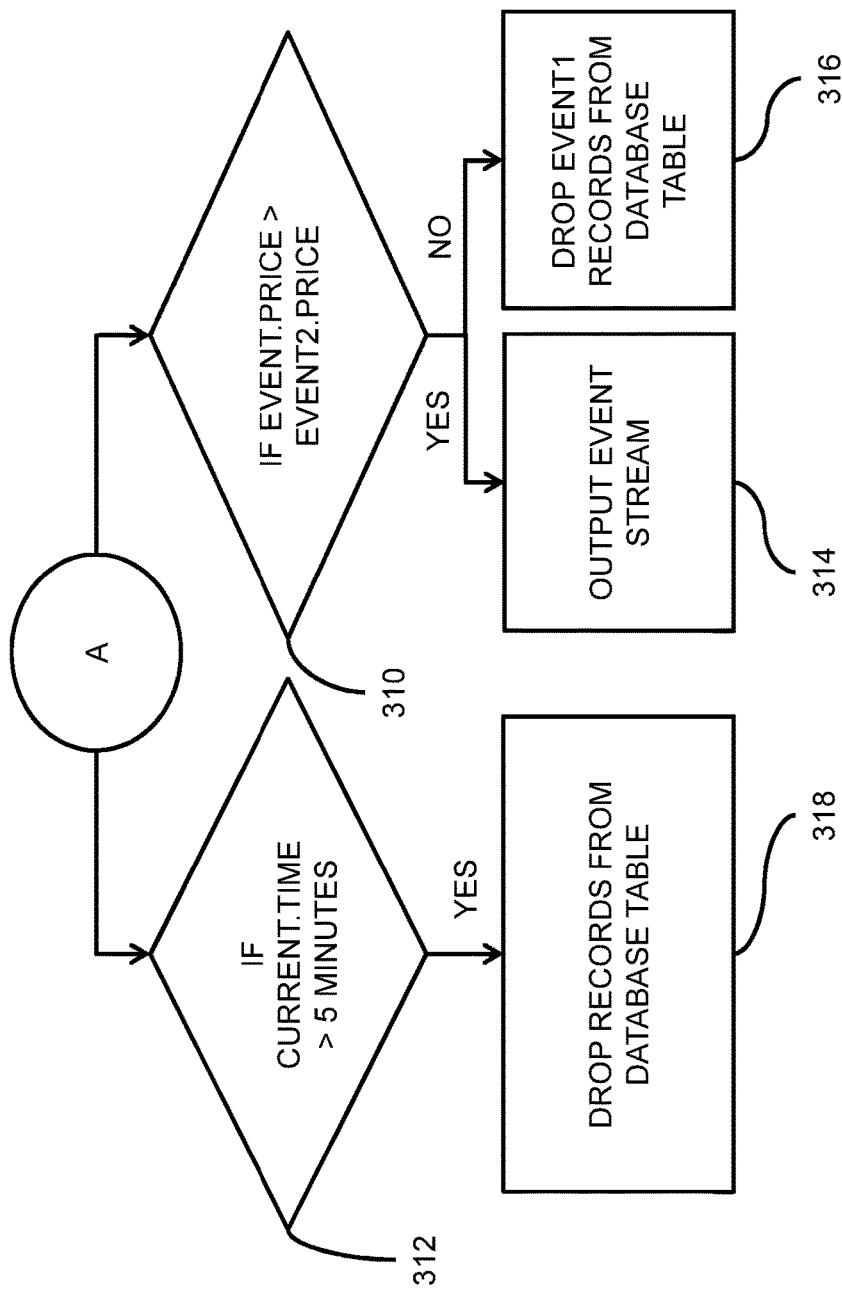
Figure 5:
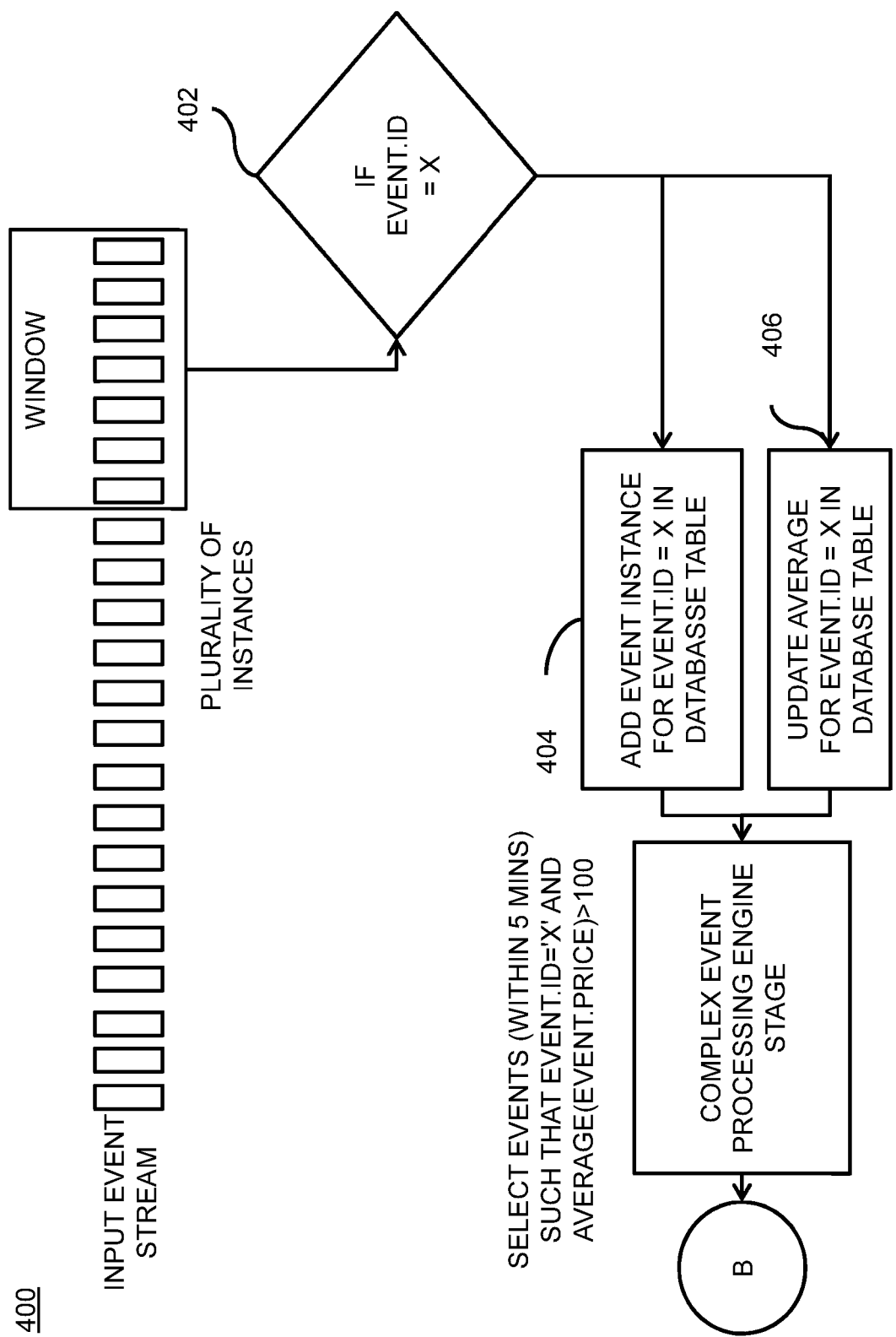
Figure 6:
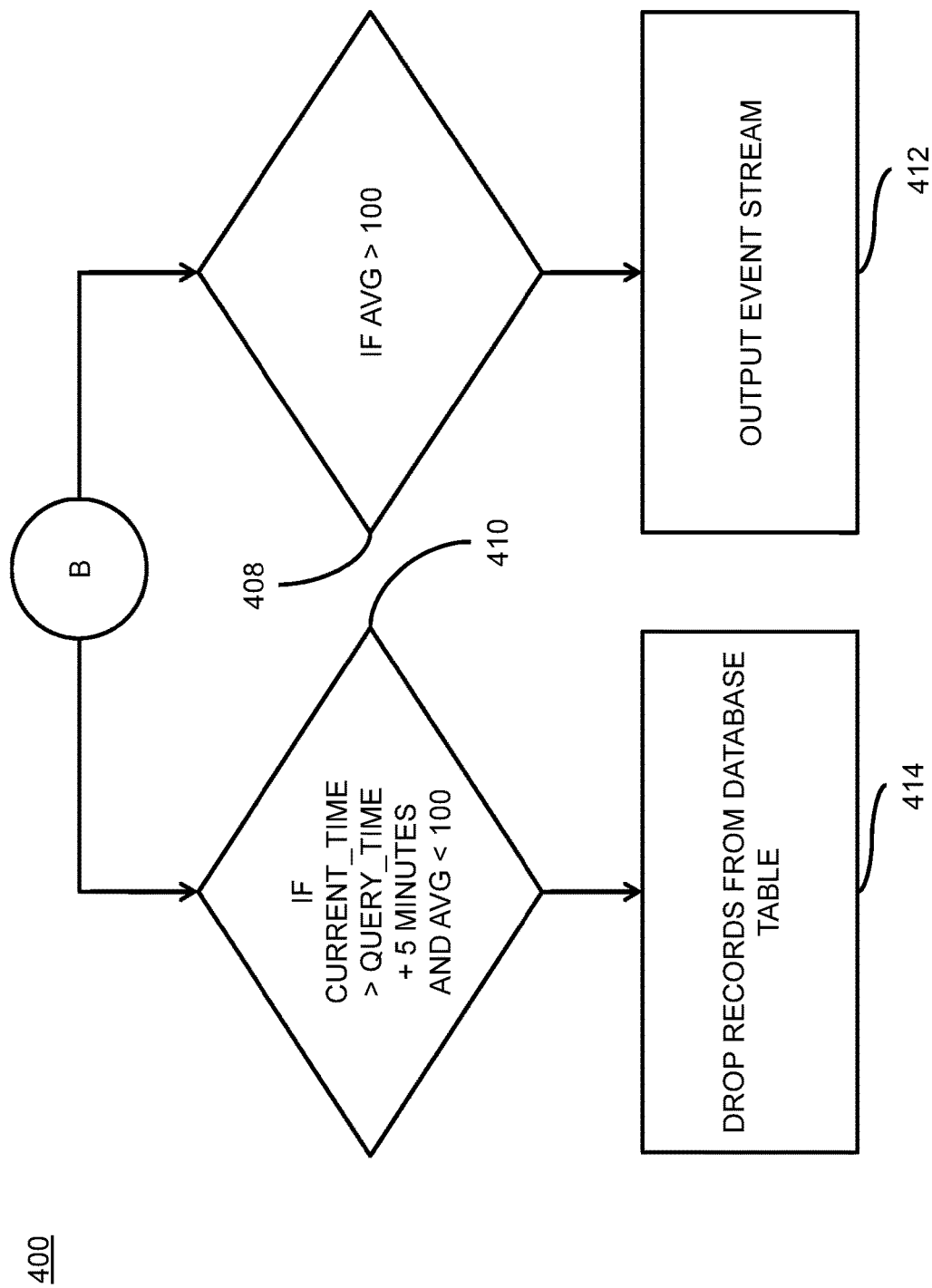
Figure 7:
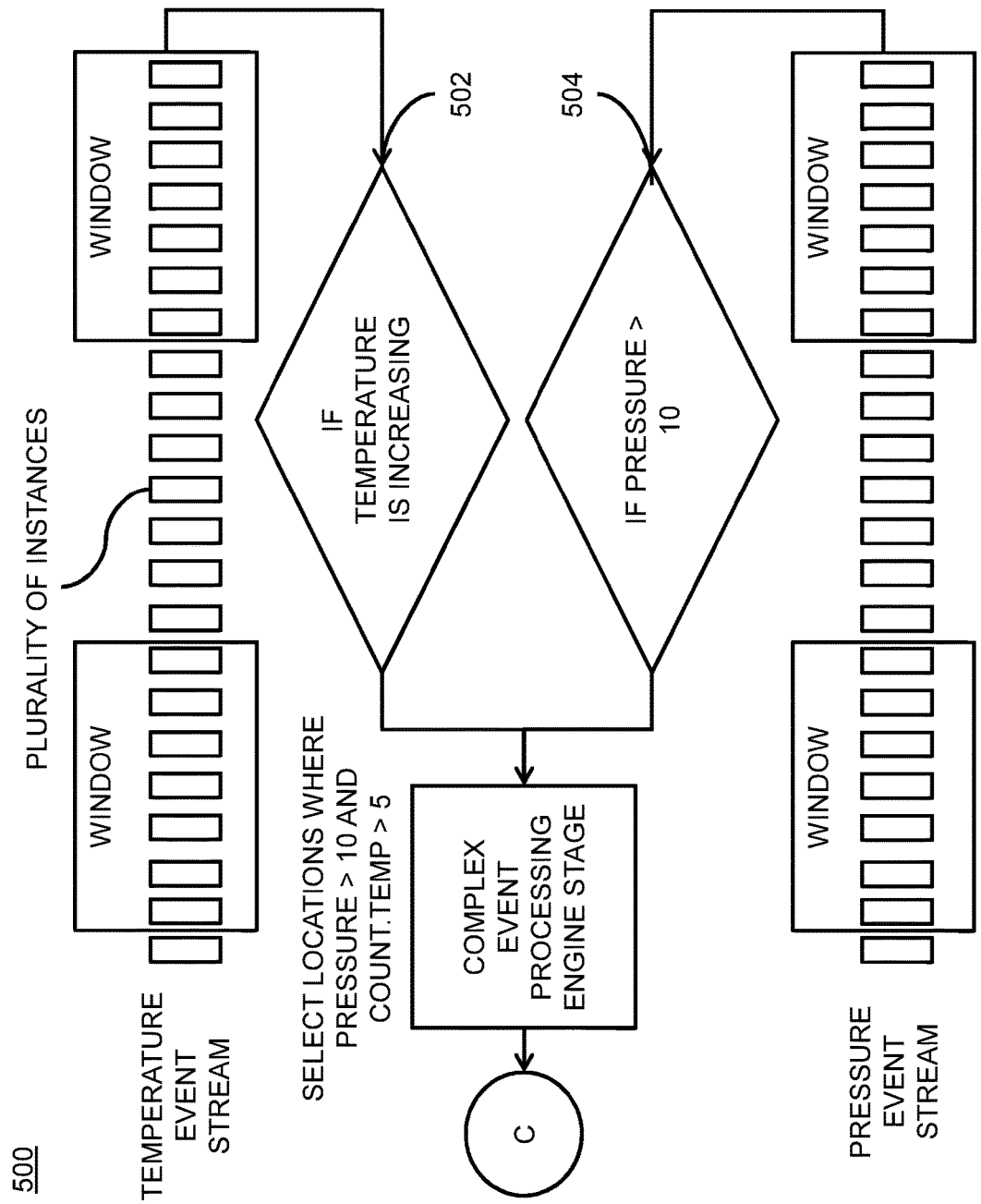
Figure 8:
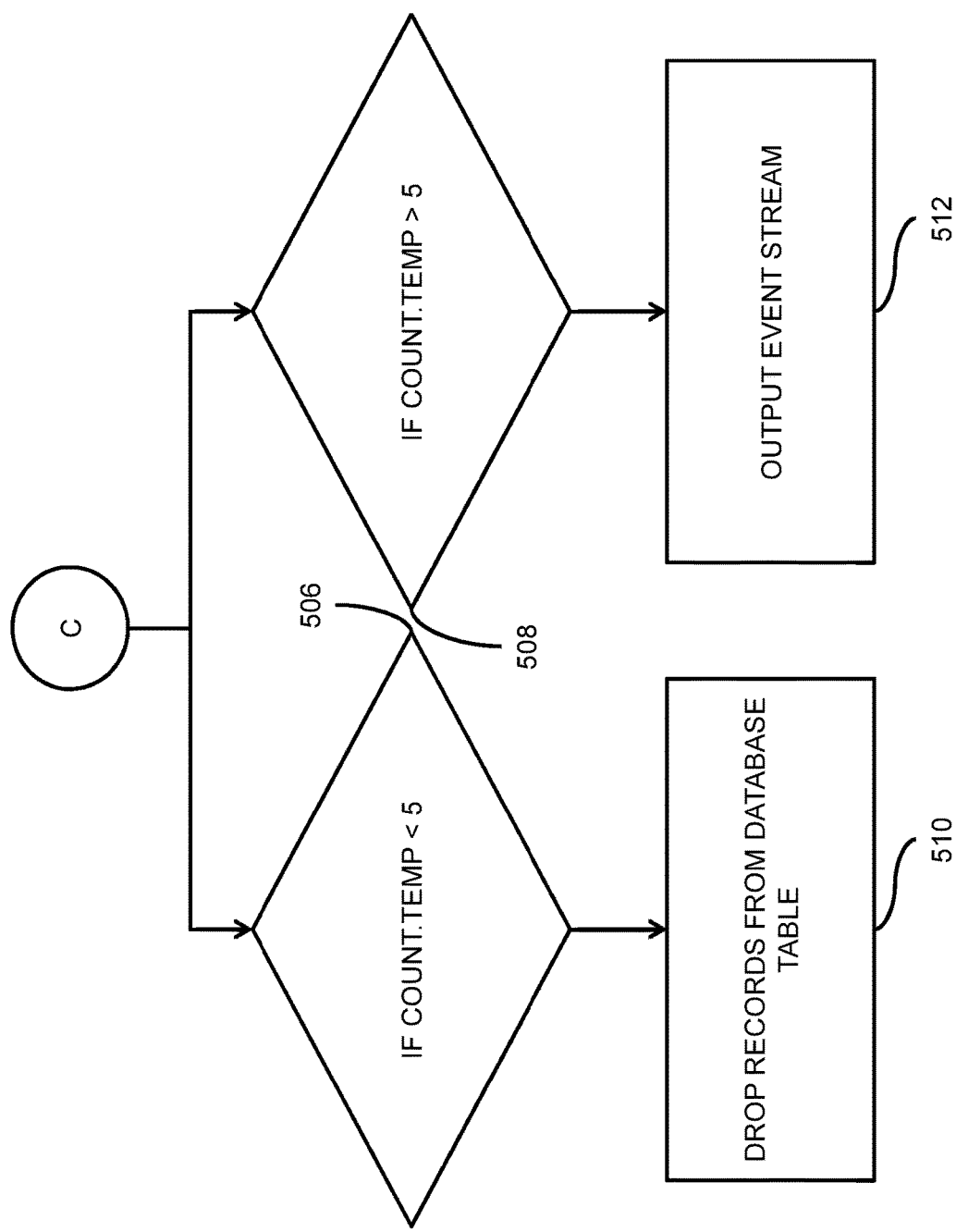
Figure 9:
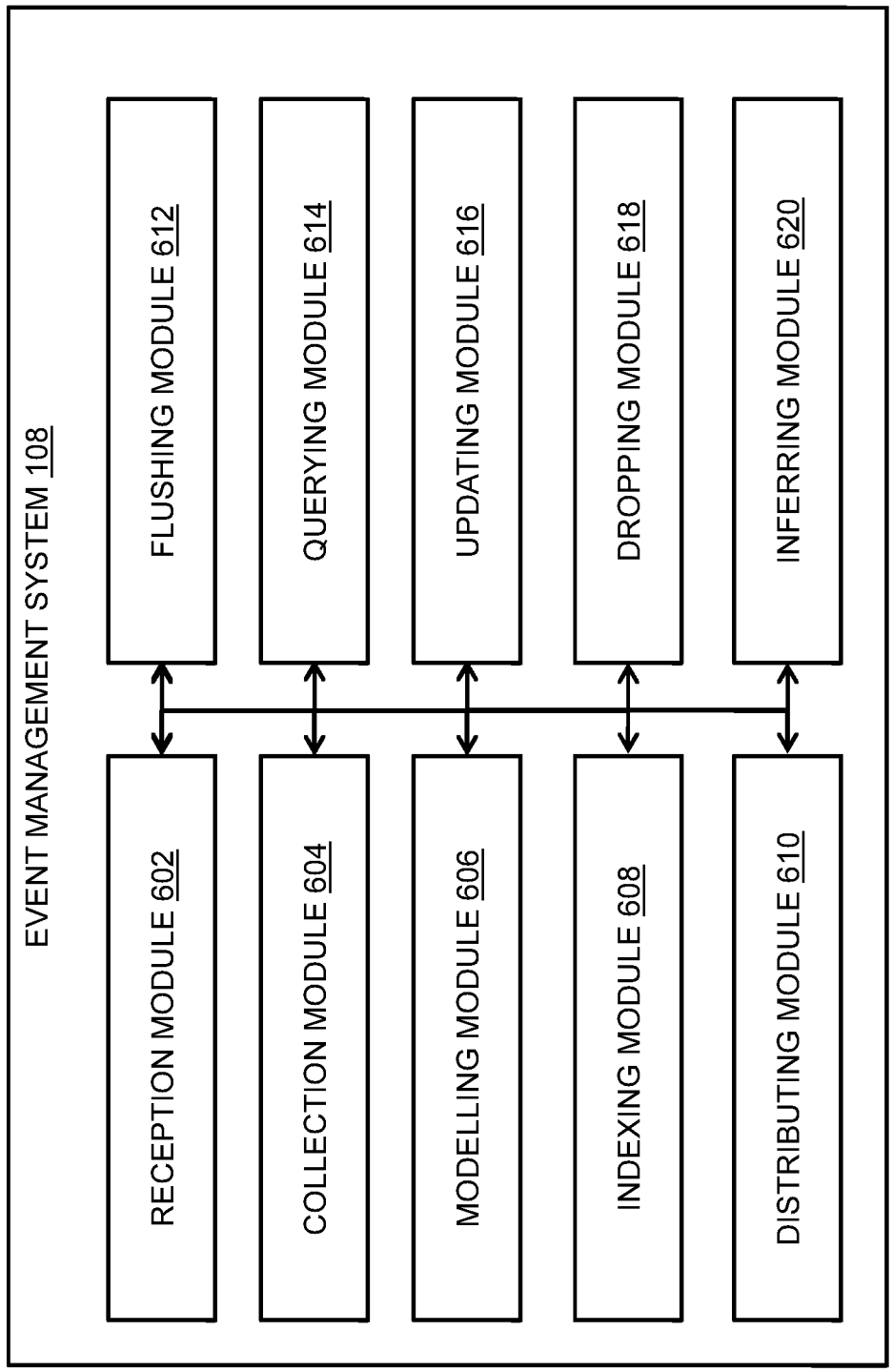
Figure 10:
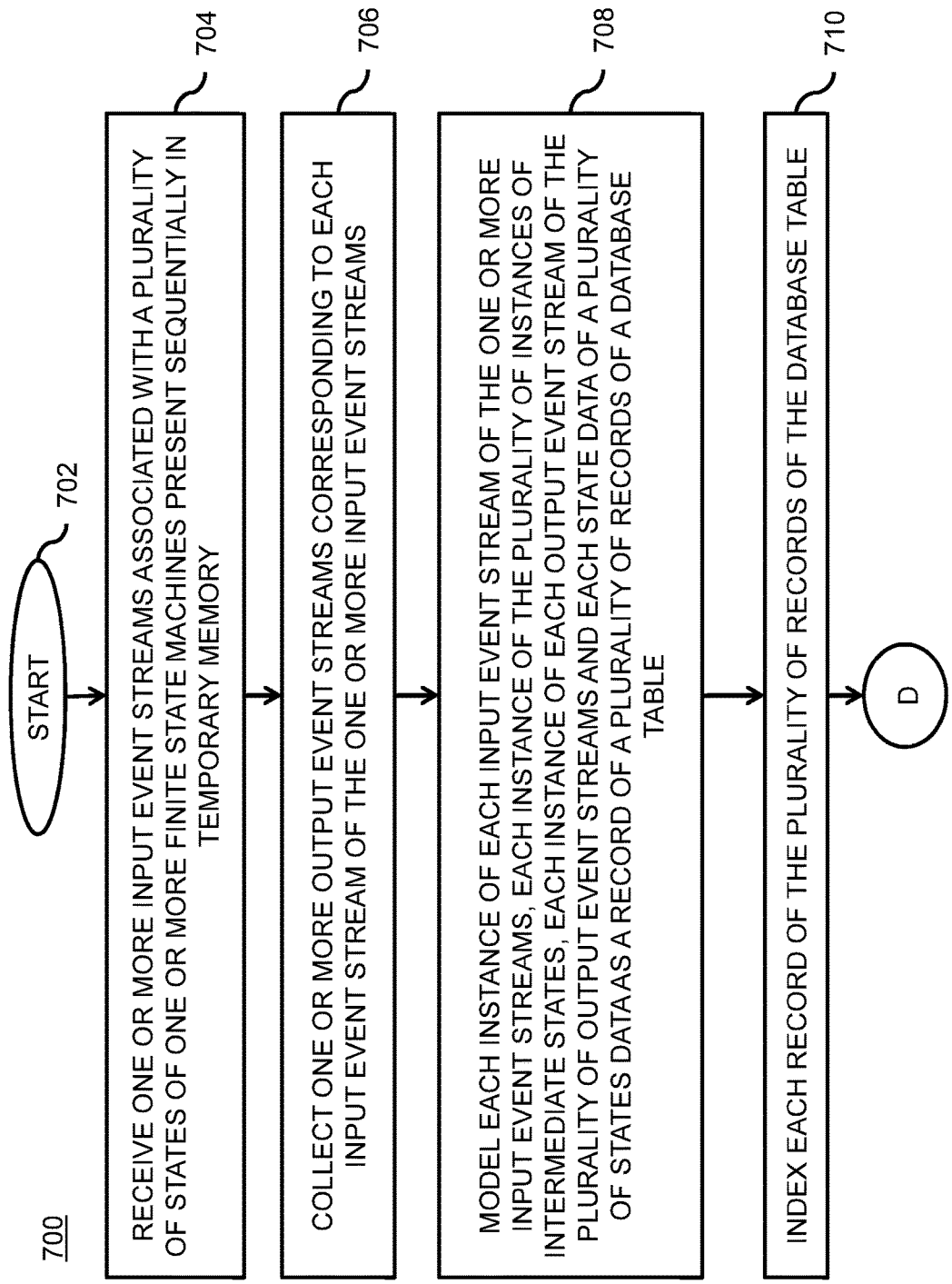
Figure 11:
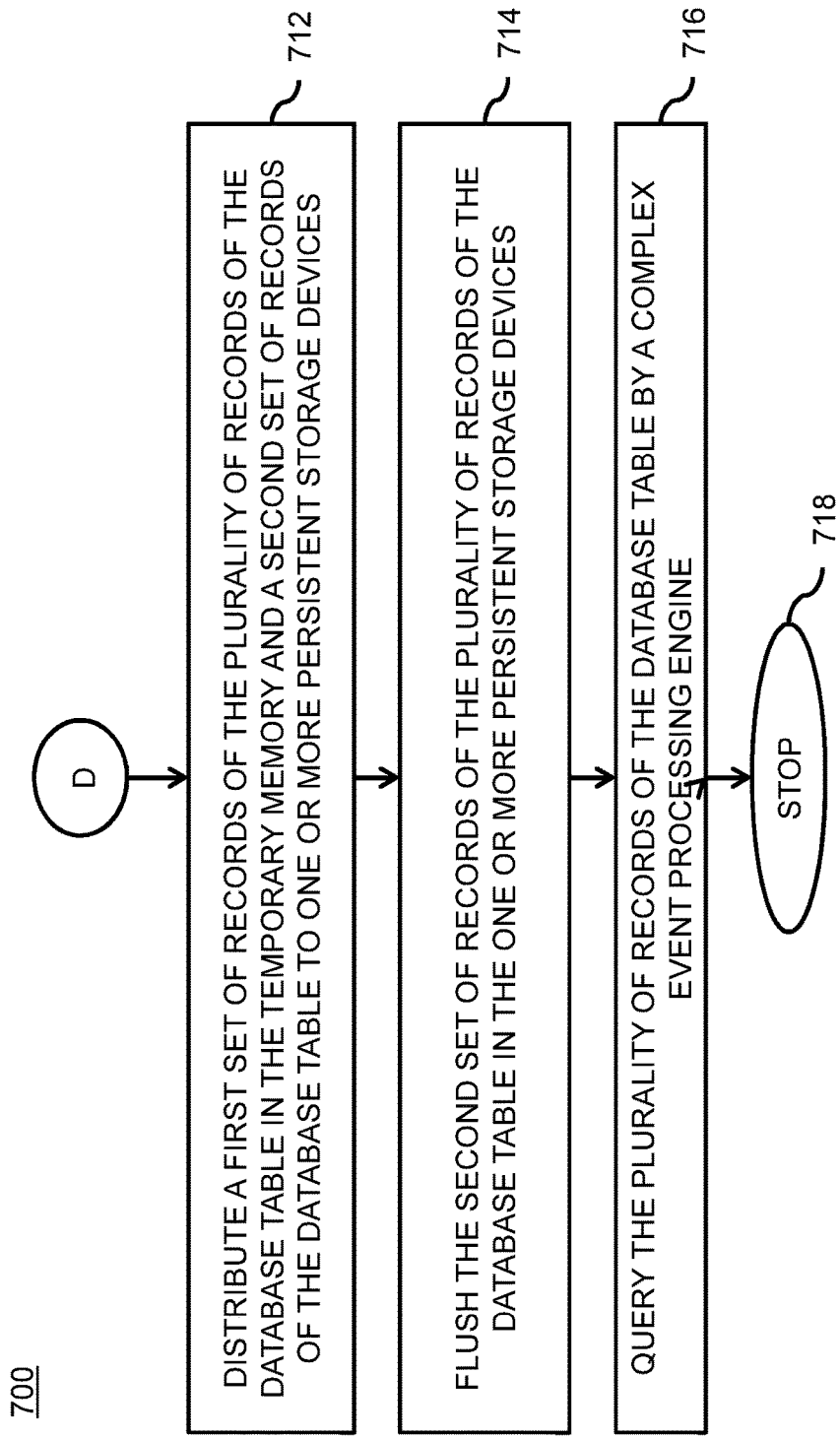
Figure 12:
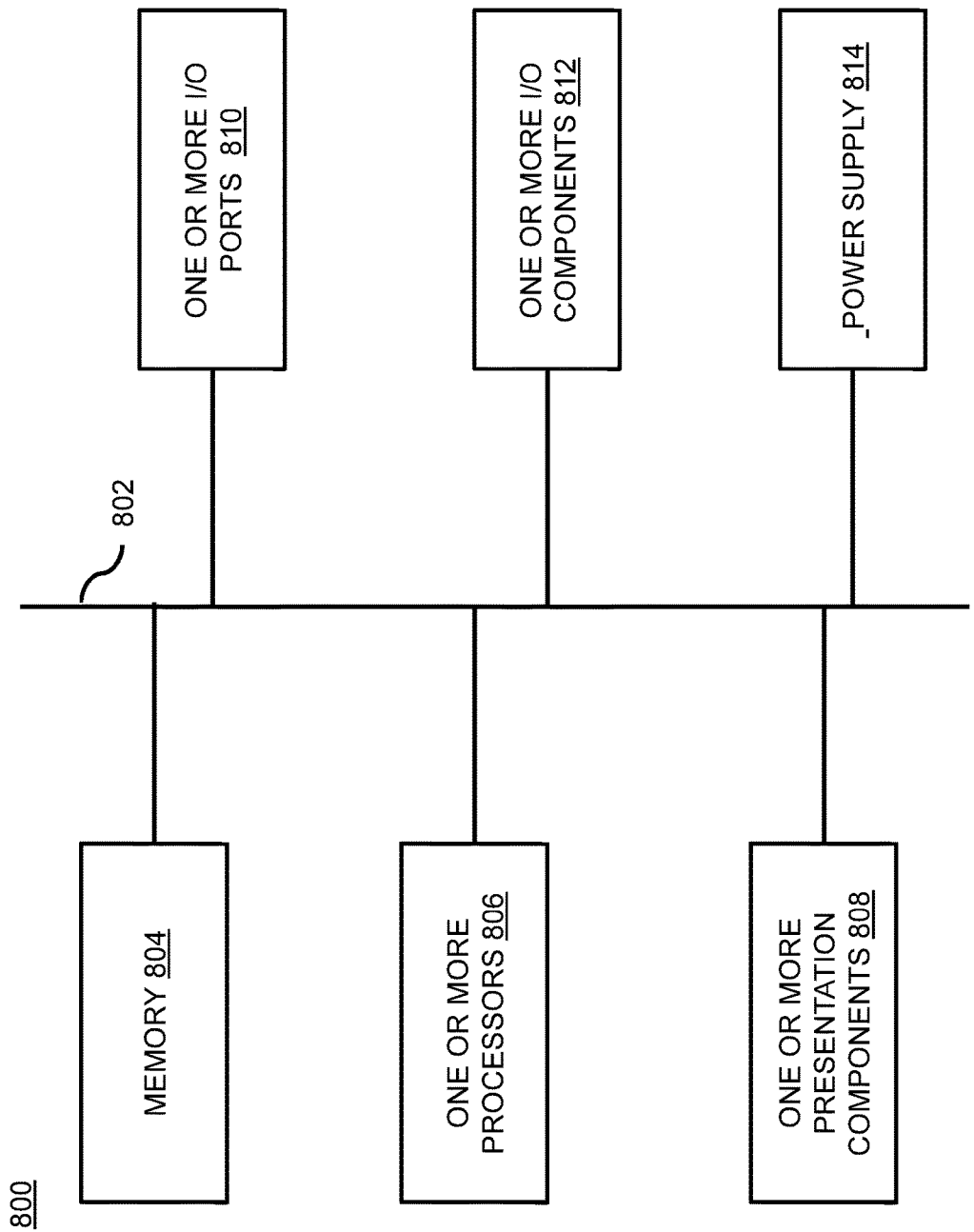

Having thus described the invention in general terms, reference will now be made to the accompanying drawings, which are not necessarily drawn to scale, and wherein:

FIG. 1 illustrates a block diagram of a real time scalable complex event processing system, in accordance with various embodiments of the present disclosure;

FIG. 2 illustrates the block diagram of the real time scalable complex event processing system, in accordance with various embodiments of the present disclosure;

FIG. 3 illustrates an example of a flow chart for performing window join queries during complex event processing of the event streams;

FIG. 4 illustrates another example of the flow chart for performing aggregation queries during complex event processing of the event streams;

FIG. 5 illustrates yet another example of the flow chart for performing complex pattern detection queries during complex event processing of the event streams;

FIG. 6 illustrates a block diagram of an event management system, in accordance with various embodiments of the present disclosure;

FIG. 7 illustrates a flow chart for performing scalable complex event processing, in accordance with various embodiments of the present disclosure;

FIG. 8 illustrates a block diagram of a computing device, in accordance with various embodiments of the present disclosure;

FIG. 9 illustrates a block diagram of an event management system, in accordance with various embodiments of the present disclosure;

FIGS. 10-11 illustrate flow charts for performing scalable complex event processing, in accordance with various embodiments of the present disclosure; and FIG. 12 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a block diagram 100 of a real time scalable complex event processing system, in accordance with various embodiments of the present disclosure. The complex event processing system is characterized by a network of multiple system elements. The complex event processing system identifies semantic relationships among and semantic information from the incoming event streams and updates states to identify occurrence of the complex event. The semantic relationship between the event streams is often characterized by temporal and non-temporal relationships. The temporal relationships focus on time bound and sequence based dependence of events.

Further, the block diagram 100 includes one or more event sources 102, a server 104 and one or more event sinks 114. The above arrangement of system elements facilitates complex event processing of event streams.

The one or more event sources 102 may be any hardware or software implementations with suitable logic to supply event streams to the server 104. In an embodiment of the present disclosure, the one or more event sources 102 may refer to an event supplier that may be a network based client end application. In another embodiment of the present disclosure, the one or more event sources 102 may be sensors or switches connected to the hardware device. In yet another embodiment of the present disclosure, the one or more event sources 102 may be any third party applications running on a target server. In yet another embodiment of the present disclosure, the one or more event sources 102 may be a database system configured to send database notifications to the server 104 (as discussed in detailed description of FIG. 2).

Further, each event source of the one or more event sources 102 is associated with the server 104 through a communication network. In general, the communication network is a part of a network layer responsible for connection of two or more communication devices. Further, the communication network may be any type of network (as discussed in detailed description of FIG. 2). Each event source of the one or more event sources 102 may generate one or more event streams. Each event stream may be associated with one or more independent events. For example, each event source may supply three event streams (as discussed in detailed description of FIG. 2).

The server 104 is a network device configured to perform complex event processing of event streams. Examples of server 104 include but may not be limited to a host computer device, a mobile device hosted server, a database server, a workstation PC, a web server, a file server and a personal computer. The server 104 is installed with an operating system. Examples of the operating systems include but may not be limited to MS-DOS, Linux, Sun, PC-DOS, MAC-OS, WINDOWS and UNIX (as discussed in detailed description of FIG. 2).

The server 104 includes a temporary memory 106, an event management system 108 and one or more persistent storage devices 110. The temporary memory 106 is installed in the main server 104. The temporary memory 106 is a volatile memory of the server 104 with a significant read/write (R/W) and input/output (I/O) rate. The temporary memory 106 provides rewritable and re-allocable memory for execution of the operations defined by complex event processing task. In addition, the temporary memory 106 provides space for storing the one or more input event streams from the one or more event sources 102 (as discussed in detailed description of FIG. 2).

The complex event processing engine 106a may be any application that stores, processes, monitors, modifies and executes complex event processing (hereinafter "CEP") queries on the one or more input event streams and one or more output event streams. In general, the complex event processing engine 106a is a database application for performing database operations on the one or more input event streams and the one or more output event streams. The complex event processing engine 106a may be present in at least one of the temporary memory 106 and the one or more persistent storage devices 110. Also, the complex event processing engine 106a evaluates complex events from simple events. In addition, the complex event processing engine 106a maintains one or more finite states machine for evaluation of a complex event. Each finite state machine includes the plurality of states. Each state corresponds to a relevant event for evaluation of the complex event (as discussed in detailed description of FIG. 2).

The event management system 108 performs operations for file handing, thread handling, arithmetic and logical operations, I/O operations, device intercommunication and network management. In addition, the event management system 108 performs operations for execution of the one or more CEP queries 204 (as shown in block diagram of FIG. 2) on the one or more input event streams and the one or more output event streams. The event management system 108 is responsible for performing operations defined by the complex event processing engine 106a. The operations of the event management system 108 may be characterized by set of processes performed by any event processing application in the processor. The event management system 108 receives the one or more event streams, collects the one or more output event streams, models each input event stream, each state data and each output event stream as records of a database table. In addition, the event management system 108 indexes each record of the database table, logically distributes the records and flushes the records to the one or more persistent storage devices 110. Also, the event management system 108 uses each input event stream to derive events affecting the plurality of states of the finite state machine. In addition, the event management system 108 dynamically updates the records and drops one or more records of the database table after execution of the one or more CEP queries 204. Also, the event management system 108 infers occurrence of the one or more complex events from one or more simple events based on transition of the plurality of states of the finite state machines. (as discussed in detailed description of FIG. 2). Further, the server 104 is associated with the one or more event sinks 114. The one or more event sinks 114 include but may not be limited to one or more display devices, one or more third party databases and one or more data storage devices (as discussed in detailed description of FIG. 2).

It may be noted that in FIG. 1, one or more event sources 102 provide the one or more input event streams to the server 104; however, those skilled in the art would appreciate that the one or more event sources 102 may provide the one or more input event streams to a distributed network of one or more servers.

FIG. 2 illustrates a block diagram 200 of a real time scalable complex event processing system, in accordance with various embodiments of the present disclosure. The complex event processing system is characterized by a network of multiple system elements. The network of multiple system elements coherently and synchronously operate to evaluate complex events from the one or more simple events. Each system element is represented by a block in the block diagram 200. The complex event processing system identifies semantic relationships among and semantic information from the incoming event streams and updates states to identify occurrence of the complex event. The semantic relationship between the event streams is often characterized by temporal and non-temporal relationships. The temporal relationships focus on time bound and sequence based dependence of events. For example, the complex event processing system may identify a complex event if two click events occur within a period of 2 seconds. The occurrence of the first click event and the second click event are temporally related by period of 2 seconds.

Further, the block diagram 200 includes one or more event sources 102, a server 104 104 and one or more event sinks 114. The above arrangement of system elements facilitates complex event processing of event streams.

The one or more event sources 102 may be any hardware or software implementations with suitable logic to supply event streams to the server 104. In an embodiment of the present disclosure, the one or more event sources 102 may refer to an event supplier that may be a network based client end application. In an example, the one or more event sources 102 may be an application or code implemented in a webpage. The client end code or application may enable collection of event data from a user in real time. In another example, the one or more event sources 102 may be any an application instance of a mobile application. The application instance may be separately collecting event related data in real time. In another embodiment of the present disclosure, the one or more event sources 102 may be sensors or switches connected to the hardware device. In an example, let us suppose that a car is installed with an air pressure sensor, a speed measuring sensor and a temperature measuring sensor. The sensors may be associated with an internet of things (hereinafter "IOT") device. The IOT device may be installed in the car. The IOT device may collect and transmit the temperature, pressure and velocity values to the server 104. The combination of sensors and the IOT device acts as the one or more event sources 102. In another example, the one or more event sources 102 may be a location device configured to supply notifications associated with entry and exit of person in a certain geographical area.

In yet another embodiment of the present disclosure, the one or more event sources 102 may be any third party applications running on a target server. For example, the target servers of an ecommerce website may be installed with third party applications to track and record data of every transaction. The data of each transaction may be transferred to the server 104 in the real time. In yet another embodiment of the present disclosure, the one or more event sources 102 may be a database configured to send database notifications to the server 104. The database notification may be associated with one or more operations. The one or more operations include but may not be limited to create, delete, drop, update, insert, sort, merge and copy.

Further, each event source of the one or more event sources 102 is associated with the server 104 through a communication network. In general, the communication network is a part of a network layer responsible for connection of two or more communication devices. Further, the communication network may be any type of network. In an embodiment of the present disclosure, the type of communication network is a wireless mobile network. In another embodiment of the present disclosure, the type of communication network is a wired network with a finite bandwidth. In yet another embodiment of the present disclosure, the type of communication network is a combination of the wireless and the wired network for the optimum throughput of data transmission. In yet another embodiment of the present disclosure, the type of communication network is an optical fiber high bandwidth network that enables a high data rate with negligible connection drops. The communication network includes a set of channels. Each channel of the set of channels supports a finite bandwidth. The finite bandwidth of each channel of the set of channels is based on capacity of the communication network.

Each event source of the one or more event sources 102 may generate one or more event streams. Each event stream may be associated with one or more independent events. For example, each event source may supply three event streams. The three event streams may include a quantity event stream, a price event stream and a transaction event stream. The number of event streams and number of instances in each event stream depends on complexity of a complex event processing task. Each event stream includes a plurality of instances. The one or more event sources 102 may send the plurality of instances in a pre-defined schema to the server 104.

The server 104 is a network device configured to perform complex event processing of event streams. Examples of server 104 include but may not be limited to a host computer device, a database server, a workstation PC, a web server, a file server and a personal computer. The server 104 is installed with an operating system. Examples of the operating systems include but may not be limited to MS-DOS, Linux, Sun, PC-DOS, MAC-OS, WINDOWS and UNIX. In an embodiment of the present disclosure, the server 104 is a local server. In another embodiment of the present disclosure, the server 104 is a remote server 104. In yet another embodiment of the present disclosure, the server 104 is a cloud server. In an example, a fault detection system of vehicle may have a local server. The fault detection system may utilize the local computer of the driver or mobile phone of the driver to execute the complex event processing task. In another example, the fault detection system of the vehicle may be associated with the cloud server. The cloud server may be running an application for performing the complex event processing task.

The server 104 includes the temporary memory 106, the event management system 108, the one or more persistent storage devices 110 and a communication interface 202. The temporary memory 106 is installed in the main server 104. The temporary memory 106 is a volatile memory of the server 104 with a significant read/write (R/W) and input/output (I/O) rate. The temporary memory 106 provides space for execution of the operations of the complex event processing task. In addition, the temporary memory 106 provides space for storing the one or more input event streams from the one or more event sources 102. In an embodiment of the present disclosure, the temporary memory 106 may be an electronics chip having a significant data transfer rate. In another embodiment of the present disclosure, the temporary memory 106 may be any electronic, organic or polymer based implementation of high speed memory devices. Examples of the temporary memory 106 include but may not be limited to synchronous dynamic random access memory (hereinafter "SD" "RAM"), DDR RAM, DDR2 RAM, DDR3 RAM, DDR4 RAM, Magnetic RAM, polymer memory and Graphene memory. In addition, the temporary memory 106 is characterized by a pre-defined memory size and a pre-defined clock rate. Examples of the pre-defined memory size includes but may not be limited to 1 Gigabytes (hereinafter "GB"), 4 GB, 8 GB, 64 GB, 128 GB and 256 GB. Examples of the clock rate include but may not be limited to 533 Mega Hertz (hereinafter "MHz"), 1033 MHz and 1667 MHz.

The complex event processing engine 106a may be any application that stores, processes, monitors, modifies and executes CEP queries on the one or more input event streams and one or more output event streams. In general, the complex event processing engine 106a is a database application for performing database operations on the one or more input event streams and the one or more output event streams. The complex event processing engine 106a may be present in at least one of the temporary memory 106 and the one or more persistent storage devices 110. Also, the temporary memory 106 loads a first event database 206. The complex event processing engine 106a evaluates complex events from simple events. In addition, the complex event processing engine 106a maintains one or more finite states machine for evaluation of a complex event. Each finite state machine includes the plurality of states. Each state corresponds to a relevant event for evaluation of the complex event. For example, the complex event processing engine 106a may be programmed to derive complex events in stock market data for "XYZ" organization. The complex event processing engine 106a may create a finite state machine having three states. The first state may correspond to increase in stock values during a period of 5 minutes. The second state may correspond to stock price touching on or above 100 Dollars price per share and the third state may correspond to a difference between the current stock price per share and 100 Dollars mark to be 5 or more Dollars.

The temporary memory 106 is associated with the event management system 108. The event management system 108 is responsible for performing operations defined by the complex event processing engine 106a. The operations of the event management system 108 may be characterized by set of processes performed by any event processing application in the processor. The event management system 108 performs operations for file handing, thread handling, arithmetic and logical operations, I/O operations, device intercommunication and network management. In addition, the event management system 108 performs operations for execution of the one or more CEP queries 204 on the one or more input event streams and the one or more output event streams. The event management system 108 dynamically executes the operations defined by the complex event processing engine 106a. The event management system 108 is configured to receive the one or more event streams, collect the one or more output event streams and model each input event stream, each state data and each output event stream as records of the database table. In addition, the event management system 108 is configured to index each record of the database table, distribute the records among a first event database 206 and a second event database 208. Moreover, the event management system 108 is configured to flush the records to the one or more persistent storage devices 110. Also, the event management system 108 is configured to query each input event stream and each output event stream to derive events affecting the plurality of states of the finite state machine. In addition, the event management system 108 is configured to dynamically update the records of the database table and drop the records of the database table after execution of the temporal query. Moreover, the event management system 108 is configured to infer the one or more complex events from the occurrence of the one or more simple events.

The event management system 108 sequentially receives the one or more input event streams from the one or more event sources 102. The one or more input event streams are associated with the plurality of states of the one or more finite state machines in the temporary memory 106. Each input event stream of the one or more input event streams includes the plurality of instances and each instance of the plurality of instances may be associated with occurrence of a simple event of the one or more simple event. Each simple event may be part of chain of associated events which are linked to the complex event. For example, let us suppose that the complex event of user identity impersonation in a credit card fraud detection system may involve detection of simple events. Such simple events may include facial features mismatch event, 5 incorrect attempts with password, mismatch and the like. Further, the simple event is associated with any application of the complex event processing. Examples of the applications of the complex event processing includes but may not be limited to Business Intelligence (BI), Business Process Management (BPM), credit card fraud detection and vehicle fault management. Further examples of the applications of the complex event processing include click stream analysis, algorithmic trading and stock market analysis.

Each instance of each input event stream is characterized by the pre-defined schema. The pre-defined schema may be related to a data structure of each instance. Each instance may be structured based on association with one or more event attributes. Examples of the one or more event attributes include but may not be limited to tags, metadata, event information, timestamps, event identity, event classifiers, event values, event origin id, event destination id and user information. For example, an event associated with stock price variations may be associated with the plurality of instances of stock price data. Each instance of the stock price variation may have a price attribute, a timestamp, an organization tag and the event id.

Further, the event management system 108 collects the one or more output event streams for each input event stream of the one or more input event streams. Each output event stream of the one or more output event streams includes the plurality of instances and the one or more states data as indexed plurality of records of the database table. The one or more states data may correspond to event attributes, definitions of simple events, time-stamps, event identifiers, and the like. The complex event processing engine 106a produces the one or more output event stream after execution of the one or more CEP queries 204 on a sliding window of the one or more records in the database table in real time. The one or more records of the database table are modeled from at least one of each incoming input event stream of the one or more input event streams and each output event stream of the one or more output event streams.

Each output event streams of the one or more output event streams includes a set of events satisfying the conditions of the one or more CEP queries 204. In addition, the event management system 108 receives the one or more input event streams for the one or more states of the one or more finite state machines. The event management system 108 models each instance of each input event stream of the one or more input event streams and each instance of each output event stream as the record of the plurality of records of the database table. In addition, the event management system 108 models each instance of the plurality of instances for intermediate states and each state data of the plurality of states data as the record of the plurality of records of the database table. The database table is synchronously inserted with the incoming instances as records. The one or more input event streams, the one or more intermediate states data and the one or more output event streams are stored in the database table to enable an efficient sliding window based complex event processing operation. Any changes in any state may be propagated by updating a record maintained for the state in the database table. The plurality of instances for the intermediate states is characterized with a complex schema in the database table.

Further, the event management system 108 indexes each record of the plurality of records of the database table. The database table is indexed for leveraging identification of key instances of the plurality of instances. The key instances may correspond to relevant records in the database table which may require updates or edits and affect transition of state of the finite state machine. In addition, the indexing of the plurality of instances, the plurality of states data and events facilitates in faster caching of the records of the database table for querying operations.

The database table may be managed by any database systems. In an embodiment of the present disclosure, the database system is a relational database system (RDBMS). In another embodiment of the present disclosure, the database system is a non-relational database system (Non RDBMS). The relational database management systems may manage the database table by any relational database languages. Example of the relational databases languages include but may not be limited to SQL, MS SQL, TSQL and ANSI SQL. In addition, the non-relational database management systems may use NOSQL databases for the database table.

Further, the event management system 108 logically distributes the first set of records of the plurality of records of the database table in the temporary memory 106. In addition, the event management system 108 logically distributes the second set of records of the database table to the one or more persistent storage devices 110. The distribution of the first set of records of the database table and the second set of records of the database table is a logical distribution. The first event database 206 is assigned to store the first set of records of plurality of records in the temporary memory 106. The first event database 206 is an in-memory database in the temporary memory 106 for real time storage of incoming event streams and complex event processed event streams. In addition, the second event database 208 is assigned to store the second set of records of the plurality of records in at least one of the one or more persistent storage devices 110. The second event database 208 is a disk based database for storing recent events as well as recent historical events. The first set of records and the second set of records of the database table are distributed based on the real time analysis of the plurality of factors. The plurality of factors includes an amount of free space in the temporary memory 106, a rate of incoming of the one or more input event streams, a complexity of the one or more CEP queries 204 and a number of stages of complex event processing engine 106a. Further, the plurality of factors includes a number of states in each of the one or more finite state machines and a complexity of schema of the database table. In addition, the plurality of factors includes the sliding window of duration of execution of the one or more CEP queries 204 and detection of the one or more complex events. The sliding window corresponds to discretized time duration for execution of the one or more CEP queries on a selected subset of instances of the plurality of instances of the one or more input event streams. The selected subset of instances of the plurality of instances corresponds to a finite set of indexed records in the database table. The selected subset of instances may be processed may be processed for at least one of filtering, window join, aggregation and complex pattern detection and the like.

The event management system 108 distributes the first set of records in the first event database 206 present in the temporary memory 106. In addition, the event management system 108 distributes the second set of records in the second event database 208 present in the one or more persistent storage devices 110. The one or more persistent storage devices 110 may be any storage devices having non-volatile storage of data. In addition, each persistent storage device may be enabled with at least one of read, write, delete and update operations. Each persistent storage device is selected based on a comparable R/W and I/O speed with that of the temporary memory 106. Examples of the persistent storage devices include but may not be limited to solid state drives (hereinafter "SSD"), hard disk drives (hereinafter "HDD"), USB 3.0 flash drives, USB 2.0 flash drives and Micro SD cards of any class. In an embodiment of the present disclosure, the first set of records of the database table corresponds to recent events. In addition, the second set of records of the database table corresponds to recent historical events. The event management system 108 distributes the current event stream to the temporary memory 106 and the recent historical events to the one or more persistent storage devices 110. The distribution of the database table across the temporary memory 106 and the one or more persistent storage devices 110 facilitates handling of complex queries, high incoming event rate and renders larger free memory for storage of incoming instances.

The event management system 108 flushes the second set of records of the plurality of records of the database table in the one or more persistent storages 110 in real time. The second set of records is flushed and stored as indexed database table in the one or more persistent storage devices 110 to provide more space in the temporary memory 106.

Further, the event management system 108 queries the plurality of records of the database table. The event management system 108 utilizes the complex event processing engine 106a for execution of the one or more CEP queries 204 on the sliding window of the one or more records of the database table in the real time. The one or more CEP queries 204 include at least one of the one or more temporal queries and one or more non-temporal queries. Each CEP query may be defined as a logical condition essential for occurrence of the event. Each CEP query may be associated with a state of the finite state machine in the database table. Each CEP query may have a pre-defined syntax. The pre-defined syntax of the one or more CEP queries 204 may managed by database administrators or users. The pre-defined syntax may be defined by a specific programming language. In an embodiment of the present disclosure, the language for defining the one or more CEP queries 204 is the structured query language (hereinafter "SQL").

Further, each CEP query may be a temporal query or a non-temporal query. The temporal query may be characterized by a timeframe for occurrence of the event and one or more conditions. In addition, each non-temporal query may be characterized by logical conditions over event properties, comparisons between event attributes and the like. Example of a pseudo code of a CEP query is "Select price of instance where price is greater than 300 and price is less than 10000 and timespan is less than 5 minutes". The above example illustrates the temporal nature of the CEP query. Example of a pseudo code of another CEP query is "Select temperature value where temperature increases consecutively for 3 times". The above example illustrates a non-temporal nature of the CEP query.

The event management system 108 updates the one or more states data of the plurality of states data based on the one or more CEP queries 204. The one or more states data of the plurality of states data are updated as records of the database table. In an embodiment of the present disclosure, the one or more states data is updated based on a positive evaluation of at least one CEP query of the one or more CEP queries 204 for at least one state of the one or more states of the finite state machine. The positive evaluation of the at least one CEP query of the one or more CEP queries 204 is associated with detection of any relevant event associated with at least one state of the one or more states of the finite state machine. In another embodiment of the present disclosure, the one or more states data may be updated based on completion of duration of the at least one of the one or more CEP queries 204. In yet another embodiment of the present disclosure, the one or more states data may be updated based on positive evaluation of a pre-defined programmed set of temporal or non-temporal conditions. Going further, the event management system 108 drops the one or more records of the database table from the temporary memory 106 and the one or more persistent storage devices 110. In an embodiment of the present disclosure, the one or more records of the database table are dropped based on a negative evaluation of the at least one CEP query of the one or more CEP queries 204. In another embodiment of the present disclosure, the one or more records of the database table are dropped based on an execution of at least one of the one or more CEP queries 204. In yet another embodiment of the present disclosure, the one or more records of the database table is dropped based on a completion of duration of execution of the at least one of the one or more CEP queries 204. In yet another embodiment of the present disclosure, the one or more records of the database table is dropped based on the completion of any pre-defined programmed set of temporal or non-temporal conditions. Further, the event management system 108 infers occurrence of the one or more complex events from a positive detection of the one or more simple events. Also, the one or more complex events are inferred from transition of the one or more states of the one or more finite state machines. The event management system 108 evaluates each complex event from state transitions in the finite state machine.

Further, the event management system 108 is associated with the communication interface 202. The communication interface 202 may be any suitable device configured to receive input, send output and perform suitable processing of input or output. The communication interface 202 may include modems, network interface cards and software with protocol conversion and data processing capabilities to initiate communication through local area network, wireless area network, web service and the like. Further, the server 104 is connected with the one or more event sinks 114 through the communication interface 202. The one or more event sinks 114 include but may not be limited to one or more display devices, one or more third party databases and one or more data storage devices. Example of the one or more display devices include but may not be limited to smartphones, televisions, monitors, desktops laptops. Example of the one or more storage devices include but may not be limited to SSD, HDD, Micro SD cards and flash drives.

It may be noted that in FIG. 2, one or more event sources 102 provide the one or more input event streams to the server 104; however, those skilled in the art would appreciate that the one or more event sources 102 may provide the one or more input event streams to a distributed network of one or more servers.

FIG. 3 illustrates an example of a flow chart 300 for performing window join queries during complex event processing of the event streams. It may be noted that to explain the process steps of flowchart 300, references will be made to the system elements of the FIG. 1 and FIG. 2. In the example, the flow chart 300 is supplemented by a complex event processing engine stage. The complex event processing engine stage is associated with the event management system 108. The event management system 108 executes operations defined by the complex event processing engine stage. The complex event processing engine stage is responsible for execution of the specific temporal or non-temporal CEP queries on incoming event streams. The event management system 108 is responsible for performing I/O operations, file handling operations, inter-device communications, logical and arithmetic operations and network management of the complex event processing task. Also, the event management system 108 receives the input event stream in the temporary memory 106. The input event stream is modeled as an indexed database table in the temporary memory 106. The input event stream includes the plurality of instances. Each instance denotes an event and each event bears the one or more event attributes. Examples of the one or more event attributes include price, event id, product tag, quantity and the like. The complex event processing engine stage aggregates the events data based on a specific temporal query on the input event stream.

Let us assume that the temporal query is based on selection of consecutive event1 and event2 within 5 minutes where event1.id is 'X' and event2.id is 'Y' and event1.price is greater than event2.price. The complex event processing engine divides the temporal query into separate independent conditions. Further, the event management system 108 fetches a first window of instance data in single operation. The size of the window depends upon the number of states and the temporary memory 106 available for storing the input event stream. At step 302, the complex event processing engine stage checks whether the id of input instance is 'X'. At step 304, the complex event processing engine stage checks whether the id of any of incoming instances is 'Y'. At step 306, the complex event processing engine stage adds the instances data for 'X' to the database table. The complex event processing engine discards any instance having id not equal to 'X' or 'Y' from the temporary memory 106. The complex event processing engine stage updates the event.id state of the finite state machines in the database table. At step 308, the complex event processing engine stage compares the price of event.id='X' with the price for event.id='Y'. Also, the complex event processing engine stage monitors the specific execution period of 5 minutes from the beginning of detection of first simple event of the complex event.

At step 310, the complex event processing engine stage checks whether the price of event.id='Y' is greater than the price for event.id='X'. At step 312, the complex engine processing stage checks whether the execution period of 5 minutes for the temporal query is over. At step 314, the complex event processing engine stage updates the output stream in the database table and updates the state of the finite state machine when the price of event.id='Y' is greater than the price for event.id='X'. At step 316, the complex event processing stage drops event1 records from the database table when the price of event.id='Y' is less than the price for event.id='X'. At step 318, the complex event processing engine may drop the records from the database table after completion of the execution period of the temporal query. In general, the input event stream is retained in the temporary memory 106 and the processed output event stream and state data may be flushed to the one or more persistent storage devices 110.

FIG. 4 illustrates another example of a flow chart 400 for performing aggregation queries during complex event processing of the event streams. It may be noted that to explain the process steps of flowchart 400, references will be made to the system elements of the FIG. 1 and FIG. 2. In the example, the flow chart 400 is supplemented by the complex event processing engine stage. The complex event processing engine stage is associated with the event management system 108. The event management system 108 executes operations defined by the complex event processing engine stage. The complex event processing engine stage is responsible for execution of the specific temporal or non-temporal CEP queries on incoming event streams. The event management system 108 receives the input event stream in the temporary memory 106. The input event stream is modeled as indexed database table in the temporary memory 106. The input event stream includes the plurality of instances. Each instance denotes an event and each event bears one or more event attributes. Examples of the one or more event attributes include price, event id, event tag, product name, quantity tag and the like. The event management system 108 aggregates the events data defined by a specific temporal query on the input event stream.

Let us assume that the temporal query is based on selecting events within 5 minutes such that event.id is 'X' and average of price attribute of event is greater than 100. The temporal query is executed for a query time period of 5 minutes. The complex event processing engine divides the temporal query into separate independent conditions. Further, the event management system 108 fetches a window of instance data in single check operation. The size of the window depends upon the number of states and the temporary memory 106 available for storing the input event stream. At step 402, the complex event processing engine stage checks whether the id of each input instance is 'X'. The complex event processing engine stage discards all the instances in the input event stream having id not equal to 'X' from the database table in the real time. The complex event processing engine stage updates the event.id state of the finite state machines in the database table. At step 404, the complex event processing engine stage adds the instance for which event.id is 'X' in the database table. The complex event processing engine stage monitors the specific execution period of 5 minutes from the beginning of detection of the first simple event of the complex event.

At step 406, the complex event processing engine computes and updates the average of the price attribute of each event with 'X' id. The average is updated in the database table. At step 408, the complex event processing engine stage evaluates whether the average is greater than 100. At step 410, the complex event processing engine stage checks whether the current time exceeds 5 minutes from the beginning of query processing for the first simple event and the average of the price attribute of each event with id 'X' is below 100. At step 412, the complex event processing engine updates the output stream in the database table and updates the state of the finite state machine. At step 414, the complex event processing engine discards the records from the database table after completion of the execution period of the temporal query. In general, the input event stream is retained in the temporary memory 106 and the processed output event stream and state data may be flushed to the one or more persistent storage devices 110.

FIG. 5 illustrates yet another example of a flow chart 500 for performing complex pattern detection queries during complex event processing of the event streams. It may be noted that to explain the process steps of flowchart 500, references will be made to the system elements of the FIG. 1 and FIG. 2. In the example, the flow chart 500 is supplemented by the complex event processing engine stage. The complex event processing engine stage is associated with the event management system 108. The event management system 108 executes operations defined by the complex event processing engine stage. The complex event processing engine stage is responsible for execution of the specific temporal or non-temporal CEP queries on incoming event streams. The event management system 108 receives a temperature event stream and a pressure event stream in the temporary memory 106. The temperature event stream and the pressure event stream are modeled as indexed database table in the temporary memory 106. The temperature event stream and the pressure event stream include the plurality of instances. Each instance denotes an event and each event bears a value of temperature or pressure. The complex event processing engine stage detects a complex pattern by implementing a specific non-temporal query on the temperature event stream and the pressure event stream.

Let us assume that the non-temporal query is based on selecting values from pressure and temperature sensors where pressure is greater 10 lbs. and count of consecutive increase in temperature is more than 5. The complex event processing engine divides the temporal query into separate independent conditions. Further, the event management system 108 fetches a window of instance data in single check operation. The size of the window depends upon the number of states and the temporary memory 106 available for storing the temperature event stream and the pressure event stream. At step 502, the complex event processing engine stage checks for a consecutive increase in the temperature for 5 times. The complex event processing engine updates the count state of the finite state machine based on processing of temperature instances. At step 504, the complex event processing engine stage checks whether the pressure instances are greater than 10 lbs. The complex event processing engine stage discards all the pressure values below less than 10 in the real time. The complex event processing engine stage updates the pressure state of the finite state machines in the database table.

At step 506, the complex event processing engine check whether the count of consecutive increase in the temperature is less than 5. At step 510, the complex event processing engine drops the pressure stream and temperature stream records from the database table when the count of consecutive increase in temperature is less than 5 from the temporary memory 106. At step 508, the complex event processing engine stage checks whether the count of consecutive increase in the temperature is more than 5. At step 512, the complex event processing engine outputs event stream of temperature and pressure values when the count of consecutive increase in the temperature is more than 5. The current pressure stream and the temperature stream is retained in the temporary memory 106 and the processed output event stream and state data may be flushed to the one or more persistent storage devices 110.

FIG. 6 illustrates a block diagram 600 of the event management system 108, in accordance with various embodiments of the present disclosure. The event management system 108 is configured to execute the operations of the complex event processing of event streams. The event management system 108 manages the one or more finite states machines in the temporary memory 106 of the server. Each finite state machine of the one or more finite state machine includes the one or more states. Each state corresponds to the event relevant for the determination of the complex event. Also, the event management system 108 is configured to handle allocation and distribution of event and state data in the temporary memory 106 and the one or more persistent storage devices 110. The event management system 108 includes a reception module 602, a collection module 604, a modeling module 606, an indexing module 608, a distributing module 610, a flushing module 612 and a querying module 614. In addition, the event management system 108 includes an updating module 616, a dropping module 618 and an inferring module 620.

The reception module 602 receives the one or more input event streams. The one or more input streams are associated with the plurality of states of the one or more finite state machines present sequentially in the temporary memory 106. Each input event stream of the one or more input event streams includes the plurality of instances. Each instance of the plurality of instances is associated with the simple event of the one or more simple events (as discussed in detailed description of FIG. 2). The collection module 604 collects the one or more output event streams. The one or more output event streams correspond to each input event stream of the one or more input event streams. Each output event stream of the one or more output event streams includes the plurality of instances and the one or more states data as indexed plurality of records of the database table. The complex event processing engine produces the output event stream after execution of the one or more CEP queries 204 one or more CEP queries 204a on the sliding window of the one or more records of the database table (as discussed in detailed description of FIG. 2). The modeling module 606 models each instance of each input event stream and each instance of the plurality of instances for the intermediate states as record of the plurality of records of the database table. In addition, the modeling module 606 models each instance of each output event stream of the plurality of output event streams and each state data of the plurality of states data as record of the plurality of records of the database table. The plurality of instances for the intermediate states is characterized with the complex schema in the database table (as discussed in detailed description of FIG. 2).

The indexing module 608 indexes each record of the plurality of records of the database table. The database table is indexed for leveraging identification of relevant instances (as discussed in detailed description of FIG. 2). Further, the distributing module 610 distributes the first set of records of the plurality of records of the database table in the temporary memory 106. In addition, the distributing module 610 distributes the second set of records of the database table to the one or more persistent storage devices 110. The first pre-defined set of records and the second pre-defined set of records of the database table are distributed based on the real time analysis of the plurality of factors. The plurality of factors include the amount of free space in the temporary memory 106, the rate of incoming of the one or more input event streams and the complexity of one or more temporal queries. In addition, the plurality of factors include the number of stages of complex event processing engine, the number of states in each of the one or more finite state machines, the size of window and the complexity of schema of the database table (as discussed in detailed description of FIG. 2). The flushing module 612 flushes the second set of records of the plurality of records of the database table in the one or more persistent storage devices 110 (as discussed in the detailed description of FIG. 2). The querying module 614 queries the plurality of records of the database table by the complex event processing engine. The complex engine processing engine executes the one or more CEP queries 204 on the sliding window of the one or more records of the database table in the real time.

Further, the updating module 616 updates the one or more states data of the plurality of states data based on the detection of simple events and positive evaluation of at least one of one or more CEP queries 204. The one or more states data of the plurality of states data are updated as records of the database table are updated (as discussed in the detailed description of FIG. 2). Furthermore, the dropping module 618 drops the one or more records of the database table from the temporary memory 106 and the one or more persistent storage devices 110. The database table is dropped after the completion of the execution period of the one or more CEP queries 204 (as discussed in the detailed description of FIG. 2). The inferring module 620 infers the one or more complex events. The one or more complex events are inferred based on the transition of the one or more states of the one or more finite state machines (as discussed in the detailed description of FIG. 2).

FIG. 7 illustrates a flow chart 700 for performing scalable complex event processing of event streams, in accordance with various embodiments of the present disclosure. It may be noted that to explain the process steps of flowchart 700, references will be made to the system elements of the FIG. 1, FIG. 2 and FIG. 6. It may also be noted that the flowchart 700 may have lesser or more number of steps.

The flowchart 700 initiates at step 702. Following step 702, at step 704, the reception module 602 receives the one or more input event streams. The one or more input event streams are associated with the plurality of states of the one or more finite state machines present sequentially in the temporary memory 106. At step 706, the collection module 604 collects the one or more output event streams corresponding to each input event stream of the one or more input event streams. At step 708, the modeling module 606 models each instance of each input event stream and each instance of the plurality of instances for intermediate states as record of the plurality of records of the database table. In addition, each instance of each output event stream of the plurality of output event streams and each state data of the plurality of states data is modeled as record of the plurality of records of the database table. At step 710, the indexing module 608 indexes each record of the plurality of records of the database table. At step 712, the distributing module 610 distributes the first set of records of the plurality of records of the database table in the temporary memory 106. The second set of records of the database table is distributed to the one or more persistent storage devices 110. At step 714, the flushing module 612 flushes the second set of records of the plurality of records of the database table in the one or more persistent storage devices 110. At step 716, the querying module 614 queries the plurality of records of the database table by a complex event processing engine. The complex engine processing engine executes one or more CEP queries 204 for a sliding window of time duration of selection of one or more records of the database table in real time.

It may be noted that the flowchart 700 is explained to have above stated process steps; however, those skilled in the art would appreciate that the flowchart 700 may have more/less number of process steps which may enable all the above stated embodiments of the present disclosure.

FIG. 8 illustrates a block diagram of a computing device 800, in accordance with various embodiments of the present disclosure. The computing device 800 includes a bus 802 that directly or indirectly couples the following devices: memory 804, one or more processors 806, one or more presentation components 808, one or more input/output (I/O) ports 810, one or more input/output components 812, and an illustrative power supply 814. The bus 802 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 8 and reference to "computing device."

The computing device 800 typically includes a variety of computer-readable media. The computer-readable media can be any available media that can be accessed by the computing device 800 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 800. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 804 includes computer-storage media in the form of volatile and/or nonvolatile memory. The memory 804 may be removable, non-removable, or a combination thereof. Exemplary hardware devices include solid-state memory, hard drives, optical-disc drives, etc. The computing device 800 includes one or more processors that read data from various entities such as memory 804 or I/O components 812. The one or more presentation components 808 present data indications to a user or other device. Exemplary presentation components include a display device, speaker, printing component, vibrating component, etc. The one or more I/O ports 810 allow the computing device 800 to be logically coupled to other devices including the one or more I/O components 812, some of which may be built in.

Illustrative components include a microphone, joystick, game pad, satellite dish, scanner, printer, wireless device, etc.

The present disclosure has several advantages over the prior art. The present disclosure provides a real time solution for storing event streams and states data for longer period during execution of more complex temporal queries. The present disclosure provides a soft limit on scalability of complex event processing of event streams. In addition, the use of indexed database table to store data of each instance and states as records provides an easier way to manipulate, fetch and update event and state changes. The recently processed data may be flushed to disk and the current instance data may be stored in the temporary memory. The use of disks to store recently processed events data provides more free space in the temporary memory for more incoming event streams.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for a scalable complex event processing of event streams, the computer-implemented method comprising:
receiving, at an event management system with a processor, one or more input event streams associated with a plurality of states of one or more finite state machines present sequentially in temporary memory, wherein each input event stream of the one or more input event streams comprises a plurality of instances and wherein each instance of the plurality of instances being associated with a simple event of one or more simple events;
collecting, at the event management system with the processor, one or more output event streams corresponding to each input event stream of the one or more input event streams;
modeling, at the event management system with the processor, each instance of each input event stream of the one or more input event streams, each instance of the plurality of instances of intermediate states, each instance of each output event stream of the plurality of output event streams and each state data of a plurality of states data as a record of a plurality of records of a database table, wherein the plurality of instances of the intermediate states being characterized by a complex schema in the database table;
indexing, at the event management system with the processor, each record of the plurality of records of the database table, wherein the database table being indexed for leveraging identification of key instances;
distributing, at the event management system with the processor, a first set of records of the plurality of records of the database table in the temporary memory and a second set of records of the database table to one or more persistent storage devices, wherein the first set of records and the second set of records of the database table being logically distributed based on a real time analysis of a plurality of factors;
flushing, at the event management system with the processor, the second set of records of the plurality of records of the database table in the one or more persistent storage devices; and
querying, at the event management system with the processor, the plurality of records of the database table by a complex event processing engine, wherein the complex engine processing engine executes one or more CEP queries on a sliding window of one or more records of the database table in real time.

2. The computer-implemented method as recited in claim 1, further comprising updating, at the event management system with the processor, one or more states data of the plurality of states data based on the one or more CEP queries, wherein the one or more states data of the plurality of states data being updated as records of the database table.

3. The computer-implemented method as recited in claim 1, further comprising dropping, at the event management system with the processor, one or more records of the database table from the temporary memory and the one or more persistent storage devices based on at least one of an execution of at least one of one or more CEP queries and a completion of a duration of execution of the at least one of the one or more CEP queries.

4. The computer-implemented method as recited in claim 1, further comprising inferring, at the event management system with the processor, one or more complex events from a positive detection of the one or more simple events, wherein the one or more complex events being inferred from a transition of the one or more states of the one or more finite state machines.

5. The computer-implemented method as recited in claim 1, wherein the plurality of factors for determining the flushing of the second set of records of the database table to the one or more persistent storage devices comprises an amount of free space in the temporary memory, a rate of incoming of the one or more input event streams, a complexity of one or more temporal queries, a number of stages in the complex event processing engine, a number of states in each of the one or more finite state machines, a complexity of schema of the database table and the sliding window of time duration of execution of the one or more CEP queries for detection of one or more complex events, wherein the sliding window corresponds to discretized time duration for executing the one or more CEP queries on a selected subset of instances of the plurality of instances of the one or more input event streams and wherein the selected subset of instances being processed for at least one of filtering, window join, aggregation and complex pattern detection.

6. The computer-implemented method as recited in claim 1, wherein the one or more CEP queries comprises at least one of one or more temporal queries and one or more non-temporal queries.

7. The computer-implemented method as recited in claim 1, wherein the first set of records of the database table being recent events and the second set of records of the database table being recent historical events.

8. The computer-implemented method as recited in claim 1, wherein each output event stream of the one or more output event streams comprises the plurality of instances and the one or more states data as indexed plurality of records of the database table and wherein the complex event processing engine produces the output event stream after execution of the one or more CEP queries on the sliding window of the one or more records of the database table.

9. A computer system comprising:
one or more processors; and
a memory coupled to the one or more processors, the memory for storing instructions which, when executed by the one or more processors, cause the one or more processors to perform a method for a scalable complex event processing of event streams, the method comprising:
receiving, at an event management system, one or more input event streams associated with a plurality of states of one or more finite state machines present sequentially in temporary memory, wherein each input event stream of the one or more input event streams comprises a plurality of instances and wherein each instance of the plurality of instances being associated with a simple event of one or more simple events;
collecting, at the event management system, one or more output event streams corresponding to each input event stream of the one or more input event streams;
modeling, at the event management system, each instance of each input event stream of the one or more input event streams, each instance of the plurality of instances of intermediate states, each instance of each output event stream of the plurality of output event streams and each state data of a plurality of states data as a record of a plurality of records of a database table, wherein the plurality of instances of the intermediate states being characterized by a complex schema in the database table;
indexing, at the event management system, each record of the plurality of records of the database table, wherein the database table being indexed for leveraging identification of key instances;
distributing, at the event management system, a first set of records of the plurality of records of the database table in the temporary memory and a second set of records of the database table to one or more persistent storage devices, wherein the first set of records and the second set of records of the database table being logically distributed based on a real time analysis of a plurality of factors;
flushing, at the event management system, the second set of records of the plurality of records of the database table in the one or more persistent storage devices; and
querying, at the event management system, the plurality of records of the database table by a complex event processing engine, wherein the complex engine processing engine executes one or more CEP queries on a sliding window of one or more records of the database table in real time.

10. The computer system as recited in claim 9, further comprising updating, at the event management system, one or more states data of the plurality of states data based on the one or more CEP queries, wherein the one or more states data of the plurality of states data being updated as records of the database table.

11. The computer system as recited in claim 9, further comprising dropping, at the event management system, one or more records of the database table from the temporary memory and the one or more persistent storage devices based on at least one of an execution of at least one of one or more CEP queries and a completion of a duration of execution of the at least one of the one or more CEP queries.

12. The computer system as recited in claim 9, further comprising inferring, at the event management system, one or more complex events from a positive detection of the one or more simple events, wherein the one or more complex events being inferred from a transition of the one or more states of the one or more finite state machines.

13. The computer system as recited in claim 9, wherein the plurality of factors for determining the flushing of the second set of records of the database table to the one or more persistent storage devices comprises an amount of free space in the temporary memory, a rate of incoming of the one or more input event streams, a complexity of one or more temporal queries, a number of stages of complex event processing engine, a number of states in each of the one or more finite state machines, a complexity of schema of the database table and the sliding window of time duration of execution of the one or more CEP queries for detection of one or more complex events, wherein the sliding window corresponds to discretized time duration for executing the one or more CEP queries on a selected subset of instances of the plurality of instances of the one or more input event streams and wherein the selected subset of instances being processed for at least one of filtering, window join, aggregation and complex pattern detection.

14. The computer system as recited in claim 9, wherein the one or more CEP queries comprises at least one of one or more temporal queries and one or more non-temporal queries.

15. A non-transitory computer-readable storage medium encoding computer executable instructions that, when executed by at least one processor, performs a method for a scalable complex event processing of event streams, the method comprising:
receiving, at a computing device, one or more input event streams associated with a plurality of states of one or more finite state machines present sequentially in temporary memory, wherein each input event stream of the one or more input event streams comprises a plurality of instances and wherein each instance of the plurality of instances being associated with a simple event of one or more simple events;
collecting, at the computing device, one or more output event streams corresponding to each input event stream of the one or more input event streams;
modeling, at the computing device, each instance of each input event stream of the one or more input event streams, each instance of the plurality of instances of intermediate states, each instance of each output event stream of the plurality of output event streams and each state data of a plurality of states data as a record of a plurality of records of a database table, wherein the plurality of instances of the intermediate states being characterized by a complex schema in the database table;

indexing, at the computing device, each record of the plurality of records of the database table, wherein the database table being indexed for leveraging identification of key instances;

distributing, at the computing device, a first set of records of the plurality of records of the database table in the temporary memory and a second set of records of the database table to one or more persistent storage devices, wherein the first set of records and the second set of records of the database table being logically distributed based on a real time analysis of a plurality of factors;

flushing, at the computing device, the second set of records of the plurality of records of the database table in the one or more persistent storage devices; and querying, at the computing device, the plurality of records of the database table by a complex event processing engine, wherein the complex engine processing engine executes one or more CEP queries on a sliding window of one or more records of the database table in real time.

16. The non-transitory computer-readable storage medium as recited in claim 15, wherein the computer readable program when executed on the computer causes the computer to perform a further step of updating one or more states data of the plurality of states data based on the one or more CEP queries, wherein the one or more states data of the plurality of states data being updated as records of the database table.

17. The non-transitory computer-readable storage medium as recited in claim 15, further comprising instructions for dropping, at the computing device, one or more records of the database table from the temporary memory and the one or more persistent storage devices based on at least one of an execution of at least one of one or more CEP queries and a completion of a duration of execution of the at least one of the one or more CEP queries.

18. The non-transitory computer-readable storage medium as recited in claim 15, further comprising instructions for inferring, at the computing device, one or more complex events from a positive detection of the one or more simple events, wherein the one or more complex events being inferred from a transition of the one or more states of the one or more finite state machines.

19. The non-transitory computer-readable storage medium as recited in claim 15, wherein the plurality of factors for determining the flushing of the second set of records of the database table to the one or more persistent storage devices comprises an amount of free space in the temporary memory, a rate of incoming of the one or more input event streams, a complexity of one or more temporal queries, a number of stages of complex event processing engine, a number of states in each of the one or more finite state machines, a complexity of schema of the database table and the sliding window of time duration of execution of the one or more CEP queries for detection of one or more complex events, wherein the sliding window corresponds to discretized time duration for executing the one or more CEP queries on a selected subset of instances of the plurality of instances of the one or more input event streams and wherein the selected subset of instances being processed for at least one of filtering, window join, aggregation and complex pattern detection.

20. The non-transitory computer-readable storage medium as recited in claim 15, wherein the one or more CEP queries comprise at least one of one or more temporal queries and one or more non-temporal queries.

* * * * *